United States Patent [19]
Luttmer

[11] Patent Number: 6,078,691
[45] Date of Patent: Jun. 20, 2000

[54] METHOD, APPARATUS, AND ARTICLE OF MANUFACTURE FOR PERFORMING IMAGE PROCESSING OPERATIONS ON RUNLENGTH-ENCODED BITMAPS

[75] Inventor: Maurice Lambert Martin Luttmer, Venlo, Netherlands

[73] Assignee: Océ-Technologies B.V., Venlo, Netherlands

[21] Appl. No.: 09/012,559

[22] Filed: Jan. 23, 1998

[51] Int. Cl.[7] .................................................. G06K 9/36
[52] U.S. Cl. .......................................... 382/235; 382/245
[58] Field of Search ..................................... 382/235, 245, 382/246; 358/261.1

[56] References Cited

U.S. PATENT DOCUMENTS

| | | | |
|---|---|---|---|
| 4,792,981 | 12/1988 | Cahill, III et al. | 382/245 |
| 5,327,248 | 7/1994 | Miller et al. | 358/261.4 |
| 5,444,549 | 8/1995 | Kondo | 358/444 |

FOREIGN PATENT DOCUMENTS

| | | | |
|---|---|---|---|
| 0279420 A2 | 2/1988 | European Pat. Off. | H04N 1/40 |
| 0407614 A1 | 1/1990 | European Pat. Off. | G09G 5/36 |

OTHER PUBLICATIONS

Akizou, et al., "Picture Processing System," English-language abstract of Japanese patent JP-A-59-081961 (May 11, 1994).

Hoshino, et al., "Pattern Coloring Terminal Using Run-Length Coding," Systems Computers Controls, vol. 13, No. 1 (1982) pp. 82–89.

Yuukichi, et al., "Picture Data Extending System," English-language abstract of Japanese patent JP-A-58-056575 (Apr. 4, 1983).

*Primary Examiner*—Leo H. Boudreau
*Assistant Examiner*—Shawn B. Cage

[57] ABSTRACT

A method, apparatus and article of manufacture performs an image processing operation directly on the runs of a runlength encoded bitmap of pixels. In the method, a first selection step selects, in the first instance, at least two runs from one or more series of runs of one or more images on the basis of pixel position information. A runlength processing operation is then performed on the selected runs in accordance with the image processing operation in order to obtain a resultant run having a resultant runlength and a resultant pixel value. In a shortening step the runlengths of the processed runs are shortened by a value derived from the determined resultant runlength. In a step size determining step a step size is derived from the resultant runlength. Thereafter, in a second selection step, one or more shortened runs and/or one or more following runs from the one or more series of runs of the one or more images are selected on the basis of the step size information and the above-mentioned steps are performed again until all the runs have been processed.

18 Claims, 8 Drawing Sheets

METHOD, APPARATUS, AND ARTICLE OF MANUFACTURE FOR PERFORMING IMAGE PROCESSING OPERATIONS ON RUNLENGTH-ENCODED BITMAPS

BACKGROUND OF THE INVENTION

1. Technical Field of the Invention

The invention relates to a method of performing an image processing operation on pixels of one or more images divided into pixels, wherein an image is represented by a series of consecutive runs with runlengths and corresponding pixel values wherein a runlength represents the number of consecutive pixels with mutually identical pixel values and the image processing operation is performed successively on groups of consecutive pixels.

2. Description of Related Art

Image processing operations of this kind include determining a resultant pixel value of a single pixel from the pixel value of a number of pixels. An example of this is a reduction processing of an image in which different pixel values are averaged to give a resultant pixel value. In this case, for example, groups of pixels are successively averaged so that a final image is obtained with less pixels.

Another example of such an image processing operation is combining in some way pixels originating from different images. An example of this is performing an overlay of a first image with a second image, one of the images being regarded as transparent for the other image.

One disadvantage of such image processing operations is the large number of processing steps conventionally required.

An additional problem is that images of pixels are often compressed in order to save memory or transmission capacity. An example of this is a compression based on runlength encoding. Before the image processing operation can then be performed, a compressed image of this kind must first be decompressed. The resultant image after processing must then be re-compressed.

Decompression and compression necessarily require additional processing steps in addition to the large number of steps already required for the image processing operation per se.

U.S. Pat. No. 5,327,248 describes an image processing apparatus in which processing operations are performed on pixels of bitmaps which remain in compressed form where possible. In the U.S. Pat. No. 5,327,248 patent, pixels are grouped in blocks, each block being compressed separately. Only those blocks having pixels to be processed are selected and decompressed. After processing the pixels of a decompressed block, the processed block of pixels is recompressed. Thus, although the U.S. Pat. No. 5,327,248 patent avoids decompressing the entire bitmap, there is nevertheless still a quantity of decompression and compression operations that are necessary, even if less than the prior art.

U.S. Pat. No. 5,444,549 describes an image processing apparatus wherein image data are reduced or subsampled in a direction perpendicular to the image lines by omitting specific image lines. For example, a ⅛ reduction omits every eighth image line. The U.S. Pat. No. 5,444,549 patent makes use of runlength encoding to determine which line should be omitted during the subsampling process. Omitting a line which in fact has the least changes in pixel values with respect to a reference line results in the least amount of information loss. The change in pixel values is, in this case, derived from the runlength of runlength encoded data and the differences therein with respect to preceding reference lines. In this patent, therefore, a runlength encoding process is introduced deliberately and with negative consequence. The disadvantage in the U.S. Pat. No. 5,444,549 patent is that a runlength encoding must be used as a part of the reduction processing, even if the compression resulting from the runlength encoding is not of itself required or desired.

SUMMARY OF THE INVENTION

The invention eliminates the above-described disadvantages by utilizing a first selection step for selecting at least two runs from one or more series of runs of one or more images on the basis of pixel position information comprising values for a column and a row of an image divided into columns and rows of pixels, a runlength processing operation for processing the runlengths and the pixel values of the selected runs in accordance with the image processing operation in order to obtain a resultant run having a resultant runlength and a resultant pixel value; a shortening step for shortening the runlength of the processed runs by a value derived from the determined resultant runlength; storing the resultant run in a series of resultant runs; a step size determining step to determine a step size derived from the resultant runlength; a second selection step for selecting the one or more shortened runs and/or one or more following runs from the one or more series of runs of the one or more images on the basis of the step size information and repeatedly performing the above steps until all the runs have been processed.

Decompression and compression are now avoided by carrying out, not the image processing operation on the separate pixels themselves, but a runlength processing operation on the runs that gives the same image processing result. Also, where possible, the corresponding runlength processing operation is carried out in one operation on a series of identical pixels of a run instead of repeated image processing operations on the separate pixels themselves.

A part of a selected run obtained after shortening that cannot be processed in one runlength processing operation, is reselected for processing in a following runlength processing operation. After an initial selection of runs based on a starting position such as the start of a first or following line, runs are then selected on the basis of a step size derived from the number of pixels processed by the runlength processing operation. By choosing a suitable step size mechanism which is also determined by the runlengths of the processed runs, an entire image can now also be processed stepwise.

A further embodiment of the invention includes a combination step for combining the resultant runs obtained after a runlength processing operation. Of the new resultant runs obtained after processing, neighbouring runs may have mutually identical pixel values. These can advantageously be combined to form larger runs so that the compression remains optimal.

In a first embodiment of the invention, the first and second selection steps select runs from a first and a second series of runs which represent a first and second image respectively, wherein runs with an identical pixel starting position are selected from both series in each selection step, the runlength processing operation comprises comparing the pixel value of a run from the first series with the pixel value of a run from the second series wherein in the event that the pixel value of the first run has a first value, the pixel value of the run from the second series is selected as the pixel value of a resultant run and in the other event the pixel value of the run from the first series is selected as the value of the resultant run and where in addition the smallest runlength of the runs from the first and second series is selected as the runlength of the resultant run, and the step size determining step takes as step size the smallest runlength determined in the preceding runlength processing operation.

In this connection, two different runlength encoded images can be combined, e.g. as an overlay of one image over the other, without first decompressing the images and then recompressing them. Of the runs which overlap regarding the pixel position and with at least one identical pixel starting position of the two images to be combined, a new run can always be generated with a runlength equal to the smallest run length of the overlapping runs and a pixel value can be determined by the run which must be regarded as non-transparent for example. The resultant part of the run with the greatest run length can be processed in a following runlength processing step.

In a second advantageous embodiment of the invention, the first and second selection steps select runs from a first, second and third series of runs which respectively represent a first, second and third image, wherein runs with an identical pixel starting position are selected from the first, second and third series of runs for each selection step, the runlength processing operation takes as the resultant pixel value of the resultant run the weighted average of the pixel values of the selected runs from the first and second series of runs with the weighting factor being the pixel value of the runs from the third series of runs and takes as the resultant runlength of the resultant run the smallest runlength of the selected runs of the first, second and third series of runs, the shortening step shortens the runlength of the largest selected runlength by the length of the resultant runlength and the step size determining step takes the resultant runlength as the step size. In contrast to the above-mentioned first embodiment, in which one of the images is always regarded as completely non-transparent, in this embodiment the degree of transparency is determined by the pixel values of a third image.

In a third embodiment of the invention, the first and second selection steps select runs with an identical pixel starting position from a first and second consecutive image size respectively, wherein in the event that the runlengths of the selected runs are all larger than one; the runlength processing operation comprises averaging the pixel value of a run from the first image line with the pixel value of a run from the second image line wherein the average pixel value thus determined is taken as the resultant pixel value of the resultant run and where in addition half the smallest runlength of the runlength of the two runs is selected as the resultant runlength of the resultant run, the shortening step shortens the runlength of the largest selected run by twice the length of the resultant runlength and the step size determining step takes as the step size twice the resultant runlength determined in the preceding runlength processing operation.

In this case it is not the pixel values of separate pixels that are averaged, but pixel values of the runlengths to be combined. As a result decompression or compression is again unnecessary and a reduction of processing steps is obtained by groupwise averaging of pixel values of runlengths instead of pixels.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
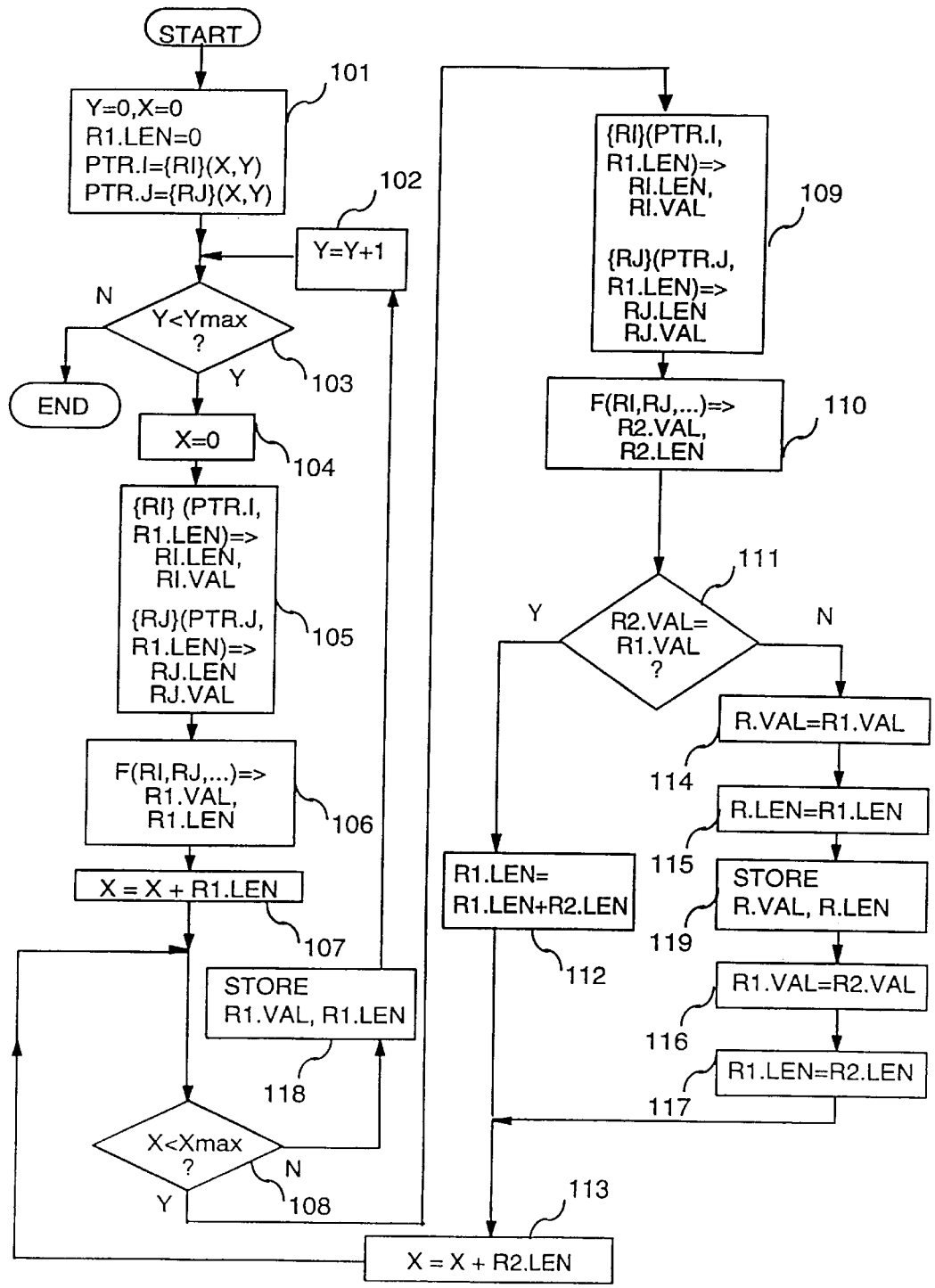
FIG. 1 is a first embodiment according to the invention.

FIG. 1 shows a first embodiment of the method according to the invention. Here it has been assumed that the runlength encoded bitmap for processing is made up of a series of runs {R} with associated runlengths R.LEN and values R.VAL. It is also assumed that the encoded bitmap has undergone a one-dimensional runlength compression. In the case of a non-encoded bitmap, the pixels of which are arranged in rows X and columns Y of pixels, it is assumed for the sake of reference that the one-dimensional runlength encoding took place in the X-direction. Xmax is the number of pixels on a line in the X-direction and Ymax the number of lines in the Y-direction.

In the embodiment described in FIG. 1, in step 101, at the start the line index Y is placed on the first line by allocating this the value zero. In step 101, pointers PTR.I, PTR.J that respectively refer to a run RI, RJ . . . from respective series of runs {RI}, {RJ} . . . are set to their initial value. In this case, the initial values of the pointers refer to runs having a pixel starting position X=0 and Y=0. A loop is then executed for all the lines Y utilizing a stepwise increase (step 102) of the line index Y that is tested by a control step 103 to determine if the last line Y has been reached.

In step 104, the pixel index X for the first pixel of a line Y is then set in this loop by allocating index X with the value zero. In step 105, the more extensive execution of which will be shown in FIG. 2, the first runs RI, RJ . . . to be processed from one or more series of runs {RI}, {RJ} . . . are selected. The runs RI, RJ . . . may originate from a series of runs {. . } of one bitmap or each from different series of runs {. . }, {. . } . . . of different bitmaps. In step 105, on the basis of the pointers PTR.I and PTR.J, which refer to the current run and a number of pixels R1.LEN already processed therefrom, and a following run is selected from the corresponding series of runs {RI} and {RJ}. Since, in step 105, the number of pixels R1.LEN already processed is still equal to zero, the run is selected to which the pointers PTR.I and PTR.J refer. In this case it is the runs corresponding to the starting pixel position X=0 and Y=0.

The selected runs RI, RJ . . . are characterised by the runlengths RI.LEN, RJ.LEN . . . and the corresponding pixel values RI.VAL, RJ.VAL . . . In step 106 the runs RI, RJ thus selected are subjected to a runlength processing F which is shown in greater detail in FIG. 3, resulting in a first resultant run R1 of runlength R1.LEN and pixel value R1.VAL. In step 107 the pixel index X is then increased by the runlength R1.LEN of the first resultant run R1.

This selection and processing is then repeated for all the pixels of a line Y in a second loop. In the loop, the pixel index X is checked in step 108 to see whether it exceeds the maximum number of Xmax pixels on a line Y. If not, then in step 118 the pixel value R1.VAL and runlength R1.LEN of the run R1 on the line Y are stored as respectively the result value R.VAL and the result runlength R.LEN; otherwise, step 109 is executed.

In step 109, on the basis of the runlength R1.LEN, and the pointers PTR.I and PTR.J initialised in step 102, the following runs RI, RJ, . . . are selected which follow on the first selected runs RI, RJ, . . . from the same series {RI}, {RJ}, . . . This selection will be explained in greater detail with reference to FIG. 2. In step 110, the runlength processing F already mentioned previously in step 106 and described in greater detail in FIG. 3, is then performed on the selected runs RI, RJ, . . . .

This runlength processing F in step 110 results in a second resultant run R2 of runlength R2.LEN and pixel value R2.VAL. Although the runlength processing F to be carried out has not yet been illustrated in detail, the following steps already indicate how two result runs obtained can if necessary advantageously be combined to form one final resultant run R of runlength R.LEN and pixel value R.VAL. For this purpose, a check is made in step 111 whether the first result value R1.VAL is identical to the second result value R2.VAL. If this is the case, then in step 112 the runlengths R1.LEN and R2.LEN are added together and allocated to the first resultant runlength R1.LEN. In these conditions, a resultant run R is not yet written away since in a following passage of the loop this runlength can be extended if necessary, if the result values are identical again.

It should be noted in this connection that in practice there is naturally a maximum for the maximum runlength to be encoded, if only as a result of the restriction in the number of bits to be used for the purpose. However, in the description of the method of the invention these and other details that are routine matters to those of ordinary skill in the art will be disregarded in order to simplify matters.

In step 113 the pixel index X is then increased by the second resultant runlength R2.LEN, whereafter the loop is traversed with a new pixel index X.

If the first resultant value R1.VAL and the second resultant value R2.VAL are found not to be identical in step 111, a final resultant value R.VAL is written away. In step 114 the first resultant value R1.VAL is allocated to the final resultant value R.VAL. In step 115 the associated first resultant length R1.LEN is allocated to the final resultant length R.LEN. This resultant run R thus formed is written away as the result of the processing F on the selected runs RI and RJ. This takes place in step 119 by storing the resultant value R.VAL and the resultant length R.LEN.

In step 116, the second resultant value R2.VAL is taken as the new value for the first resultant value R1.VAL. In step 117, the second resultant length R2.LEN is taken as the new length for the first resultant length R1.LEN. Thus on the new passage of the loop a check can be made whether the second resultant run R2 can be combined with a following resultant run.

Thus by combining the resultant runs R obtained with the runlength processing F as far as possible, a series of resultant runs R is obtained which is as restricted as possible.

Figure 2:
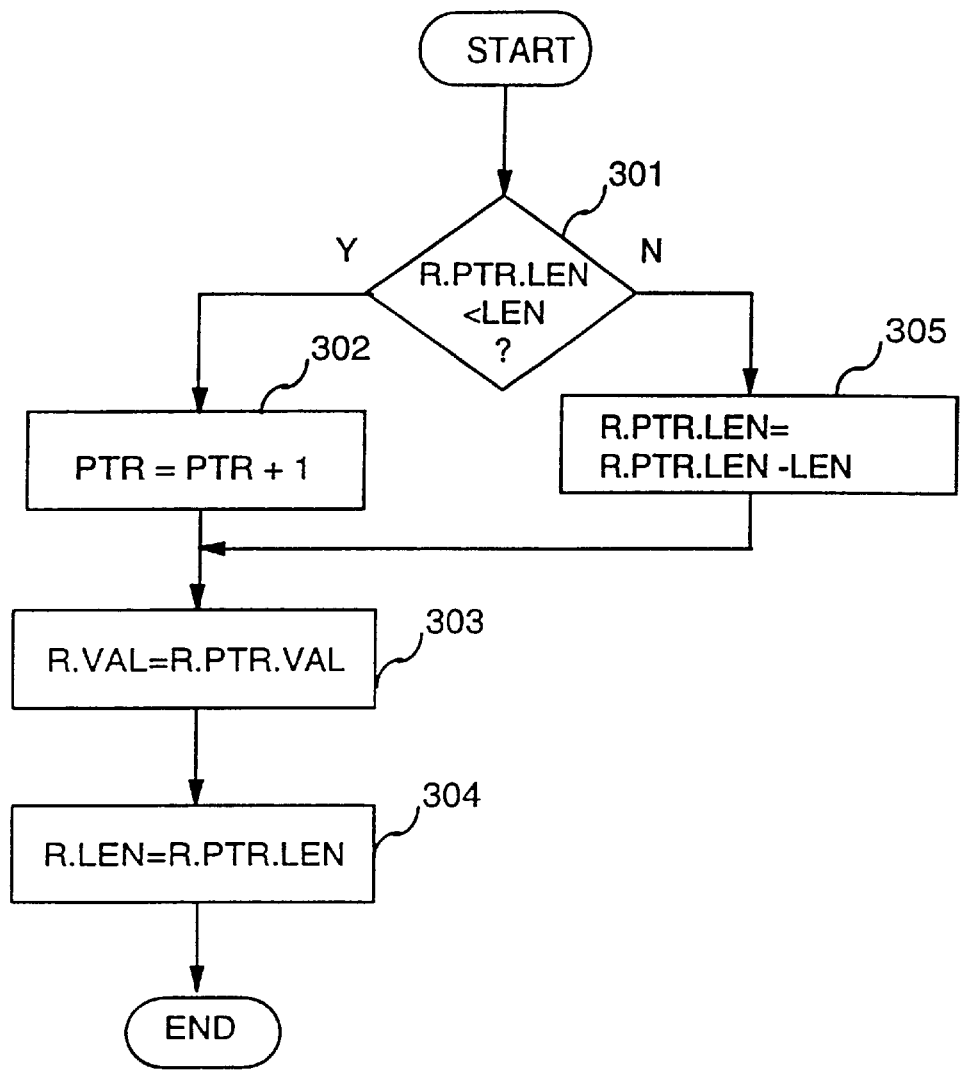
FIG. 2 shows the selection of a following run from a series of runs on the basis of a pointer and a specific number of pixels according to FIG. 1.
Figure 3:
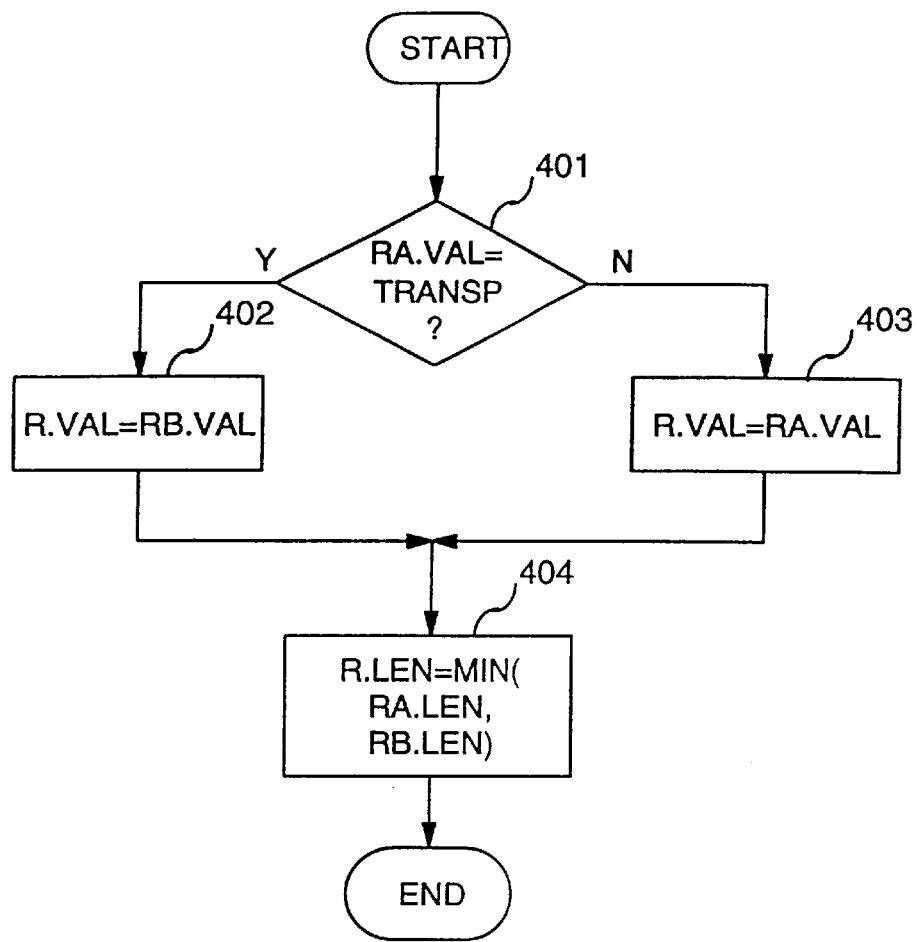
FIG. 3 is an embodiment of an overlay processing of two bitmaps according to FIG. 1.

In FIG. 2, the steps 105 and 109 of FIG. 1 are developed further. These steps 105 and 109 relate to the selection of the runs RI, RJ, . . . of a line Y from the series of runs {RI}, {RJ}, . . . of one or more bitmaps. In this connection, runs RI, RJ . . must be selected which come at a specific distance, expressed in number of pixels, after a run specified by a pointer PTR.I, PTR.J from the series of runs {RI}, {RJ} . . . In FIG. 2 this selection is described in respect of one run R from a series of runs {. . } of one bitmap. Of course, in the case of the required selection from a series of runs {. . } of a second bitmap, the method described in FIG. 2 will again be performed. The first resultant length R1.LEN is taken as the input value for the distance LEN. In the first instance this is defined in step 101 of FIG. 1 and then always in step 112 or 117 of FIG. 1. As a value for the pointer PTR, in the first instance the value found in step 105 is taken and in the second instance the following values to be determined in step 109.

If step 301 shows that the length R.PTR.LEN of the run R.PTR selected by the pointer PTR is smaller than or equal to the input distance LEN, the pointer PTR is raised one step in step 302 so that reference is made to the following run in the same line. The value R.PTR.VAL of the run R.PTR selected by the increased pointer PTR is then taken as the resultant value R.VAL (step 303). The runlength R.PTR.LEN of the same run is taken as the resultant length R.LEN (step 304). This result value R.VAL and resultant length R.LEN correspond to the value and length of the following selected run as shown in FIG. 1.

If, however, step 301 shows that the length R.PTR.LEN is greater than the distance LEN, then in step 305 the selected length R.PTR.LEN of the run R.PTR selected by the pointer PTR reduced by the distance LEN is taken as the new length R.PTR.LEN. This new length R.PTR.LEN is then again taken as the resultant length R.LEN in step 304.

FIG. 3 shows one possible alternative of the runlength processing F as referred to in step 106 and 110 of FIG. 1. Here it is assumed that selected runs RA and RB for processing originate from two different bitmaps A and B and at least the pixel starting position of both runs is the same. Hence run RA is a selected run from the series {RA} for bitmap A and run RB is a run selected from the series {RB} for bitmap B. The runlength processing F superimposes the runs of the two bitmaps, in which case pixels of the bitmap A can be transparent for the pixels of bitmap B.

In step 401 a check is made whether the value RA.VAL of the selected run RA of the bitmap A must be considered as being transparent. If so, then in step 402 the value RB.VAL of the selected run RB of the bitmap B is taken as the resultant value R.VAL. Otherwise, in step 403, the value RA.VAL of the selected run RA of the bitmap B is taken as the resultant value R.VAL.

In both cases, in step 404 the minimum of the two selected runlengths RA.LEN and RB.LEN is taken as the resultant runlength R.LEN.

As already stated, the great advantage of the above-described method is that there is no need to check whether each pixel is or is not transparent. By processing a number of pixels in the form of a run simultaneously this overlay processing can be performed more rapidly than conventional overlay processing. An additional advantage is that in the case of pixel-wise processing a runlength encoded bitmap would first have to be decoded and then encoded again after processing.

In this connection it should be noted that the above-described embodiment is based on the fact that the bitmap B must be regarded as completely non-transparent. A different construction is obtained, for example, by regarding the bitmap B as partially transparent. The degree of transparency of the bitmap can be represented for each pixel by a third bitmap C with the degree of transparency stored for each pixel. The weighted average of the pixel values of the two bitmaps A and B can be taken as the resultant value R.VAL of such an overlay processing. On the basis that the value stored in the bitmap B is standardised at one for the transparency, then R.VAL is given by:

R.VAL=(RC.VAL*RA.VAL)+(1−RC.VAL)*RB.VAL where RA.VAL and RB.VAL are the values of runs from the bitmap A and B and RC.VAL is the degree of transparency which applies to both runs.

The invention is not restricted to the overlay processing of two runlength encoded bitmaps described in FIG. 3. As an example of a processing on runs of one and the same bitmap, an embodiment will be described hereinafter which effects a resolution conversion of a runlength encoded bitmap.

The following does not simply give a description of the runlength processing F per se, but also, on analogy with the method of FIG. 1, the steps to be performed around the runlength processing F.

Figure 4:
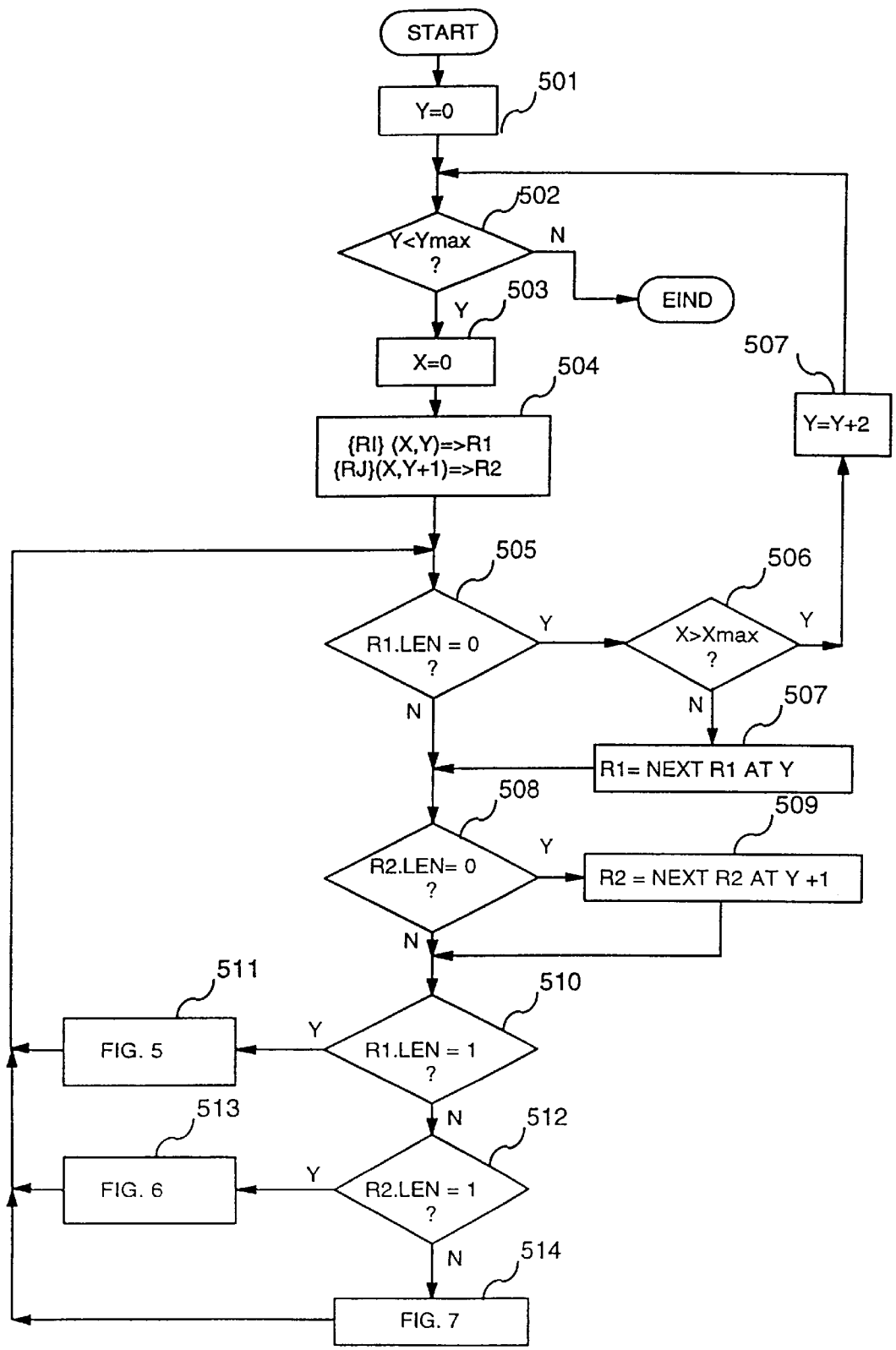
FIG. 4 shows a second embodiment according to the invention.

For this purpose, a second embodiment of the invention is shown in FIG. 4. As in the method according to FIG. 1, it is again assumed that the runlength encoded bitmaps for processing represent bitmaps are divided into lines with a line index Y, wherein the pixels in a line have the pixel index X. With these conditions, in step 501, the line index Y is placed on the first line of the bitmap by allocating it the value zero. In step 502 the value of the line index Y is compared with the value Ymax for the last line. As long as the last line is not reached, the process continues in step 503 by placing the line index X on the first pixel for processing of a line Y by also allocating this the value zero.

The processing to be performed is a resolution conversion processing. In this example, the resolution is to be reduced in two directions by a factor of 2. Here the image is divided into blocks of 2×2 pixels, wherein each of these blocks is converted to one pixel having as the pixel value the average of the four pixel values of the pixels of the associated block.

For this purpose, in step 504 two runs R1 and R2 of two consecutive lines having the line index Y and Y+1 are selected by reference to the pixel index X and the line index Y from the series of runs {RI}, which represent the bitmap for processing. If the line index still has the value zero, these are the first runs of the two lines.

Step 505 checks whether the run length R1.LEN of the run R1 is equal to zero. If so, then step 506 checks whether the pixel index X has reached the maximum value Xmax. In that case the line index Y is increased with a step increment of two in step 507 and the next two lines are processed. If the pixel index X has not yet reached the maximum value Xmax, then in step 507 the following nearest run R1 is selected from the line Y.

If, however, the length R1.LEN of the first selected run R1 is greater than zero, then step 508 also checks whether the length R2.LEN of the run R2 of line Y+1 is equal to zero. If so, then in step 509 the next run R2 from the line Y+1 is selected.

Step 510 then checks whether the run length R1.LEN of run R1 from line Y has the value one. If so, a first processing step 511 follows which will be described in detail with reference to FIG. 5. If the run length R1.LEN is not equal to one, then step 512 checks whether the run length R2.LEN of the run R2 from the line Y+1 has the value one. If so, then a second processing step 513 is performed as described in detail with reference to FIG. 6.

Figure 6:
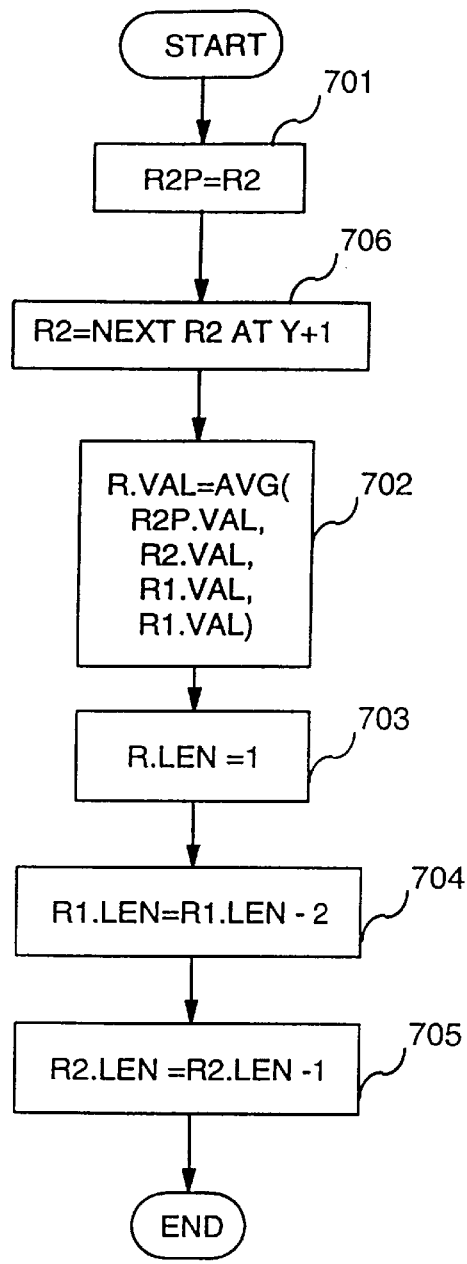

If the two runlengths R1.LEN and R2.LEN of the lines Y and Y+1 are greater than one, a third processing step 514 is performed as described in detail in FIG. 6.

Each processing step delivers a final result run R with a value R.VAL and a runlength R.LEN. The procedure is repeated for all the runs so that a final series of runs {R} is obtained which represents the runlength encoded bitmap but now with half the resolution of the original bitmap. Of course a resultant run R obtained is always stored although this is not explicitly shown in FIG. 7.

Figure 5:
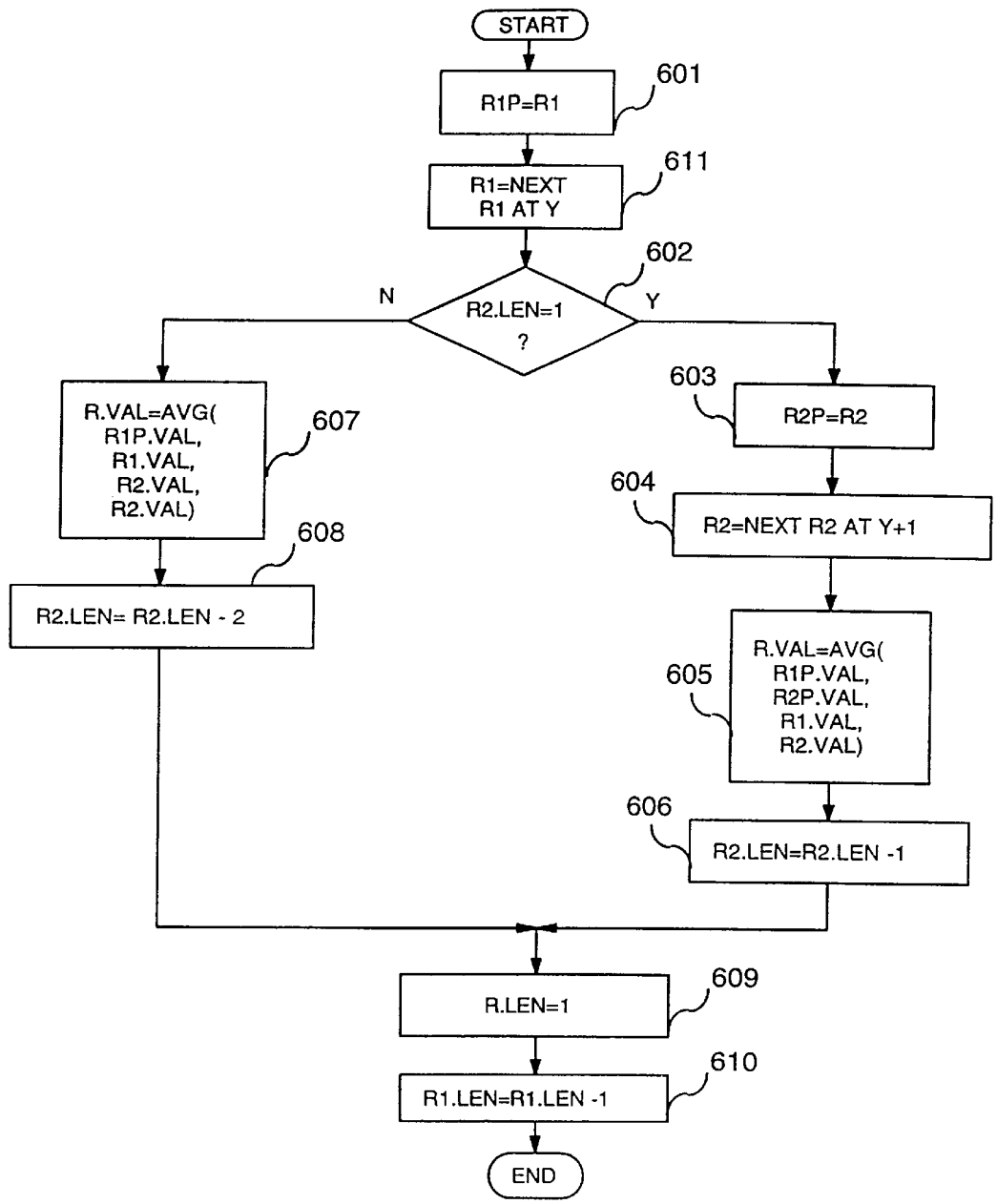
FIGS. 5 and 6 show the performance of a resolution conversion operation in the case of runs having a runlength of one according to FIG. 4.

The first processing step 511 of FIG. 4 is described in detail in FIG. 5. Here, the runlength R1.LEN of the run R1 on line Y is thus equal to one.

In step 601 the selected run R1 is noted as the previous selected run R1P. In step 611 the following run R1 of the line Y is selected. Step 602 checks whether the runlength R2.LEN of the selected run R2 of the following line Y+1 is equal to one. If so, then in step 603 the selected run R2 is noted as previous selected run R2P. Step 604 takes as the new run R2 the following next run in the line Y+1. In step 605 the final result value R.VAL is then determined as an average of the values R1P.VAL, R2PVAL, R1VAL and R2.VAL of the runs R1P, R2P, R1 and R2.

The length R2.LEN is then reduced by one in step 606.

If, however, step 602 shows that the runlength R2.LEN of the run R2 is not equal to one, then the result value R.VAL is immediately determined in step 607 as an average of the result values R1P.VAL, R1.VAL, R2.VAL and R2.VAL of the runs R1P, R1 and R2. Here, the value R2.VAL is thus counted twice. The runlength R2.LEN is then reduced by two in step 608.

In step 609 the value one is taken as the resultant runlength R.LEN. In step 610 the runlength R1.LEN is then reduced by one.

In FIG. 6 the processing step 513 of FIG. 4 is developed in detail. Here the runlength R2.LEN of the run R2 is equal to one. The runlength R1.LEN is, however, greater than one.

In step 701, run R2 is noted as the previous run R2P and the following run on the line Y+1 is taken as the new run R2 (step 706). In step 702 an average of the result values R2P.VAL, R2.VAL, R1.VAL and R1.VAL of the runs R2P, R2 and R1 is taken as the resultant value R.VAL. In step 703, one is taken as the resultant length R.LEN. In step 704 the runlength R1.LEN is reduced by two and in step 705 the runlength R2.LEN is reduced by one.

Figure 7:
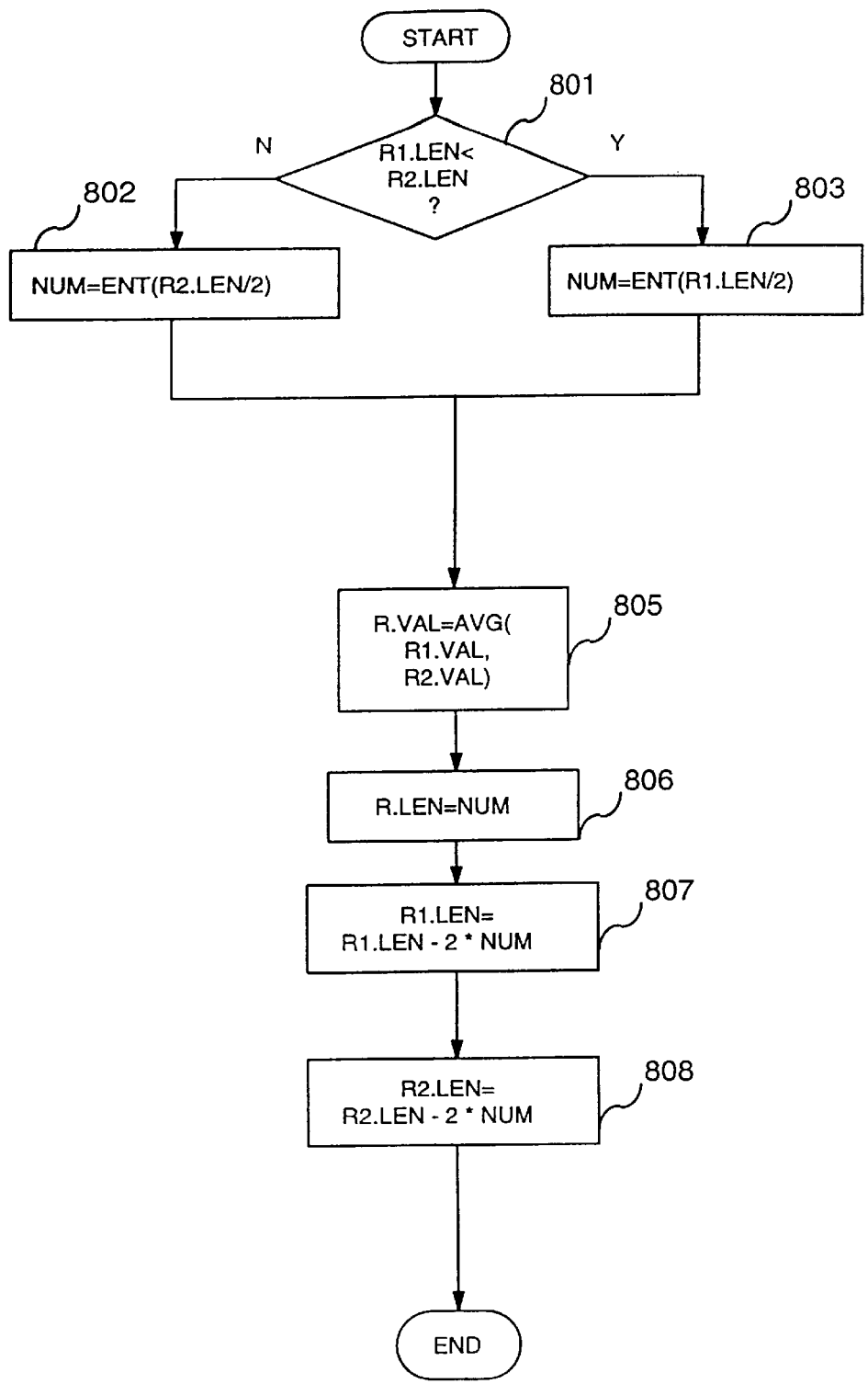
FIG. 7 shows the performance of a resolution conversion processing in the case of runs having runlengths greater than one according to FIG. 4.

Finally FIG. 7 describes in detail the processing step 514 of FIG. 4. Here, therefore, the runlengths R1.LEN and R2.LEN are both greater than one.

If step 801 shows that the runlength R1.LEN is smaller than the runlength R2.LEN, then in step 803 the half of the runlength R1.LEN is determined. Here the value obtained is rounded off around the first whole smaller value by means of the mathematical ENTIER function. The value obtained is allocated to the variable NUM. Otherwise, if R2.LEN is the shortest runlength, then in step 802 the same procedure is carried out but now on the runlength R2.LEN.

In step 806, the value of the variable NUM is taken as the resultant runlength R.LEN. The runlengths R1.LEN and R2.LEN are reduced in steps 807 and 808 respectively by twice the value of the variable NUM.

Only in the method according to FIG. 7, therefore, is there any reference to averaging for a series of pixels, unlike the above-described situations in FIGS. 5 and 6, where at least one of the runs for processing had a length of one.

Computer For Implementing Inventive Methods

Figure 8:
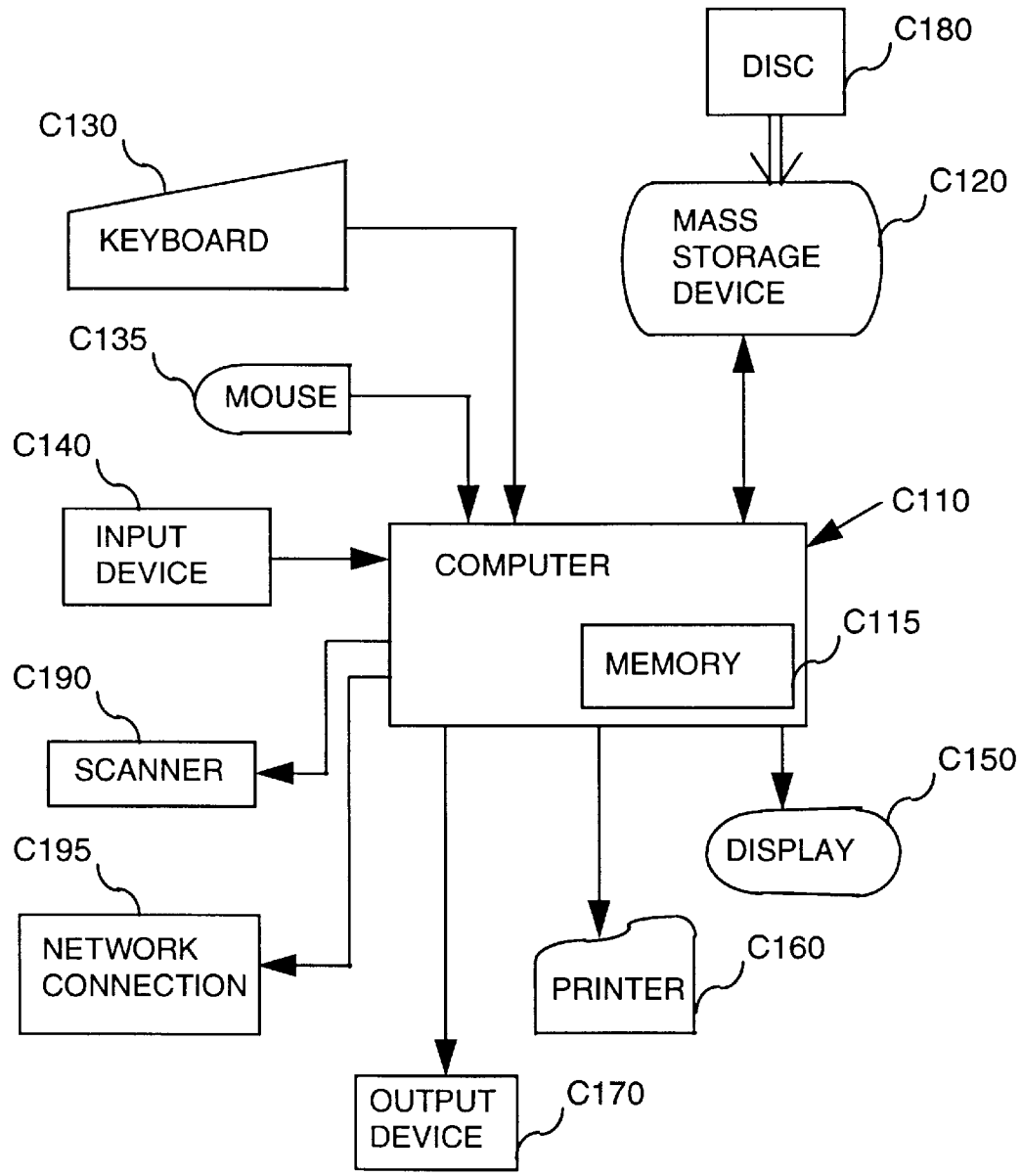
FIG. 8 illustrates a computer system and article of manufacture that implement the techniques of the invention.

A computer apparatus suitable for programming with the inventive methods is diagrammatically shown in the block diagram of FIG. 8. The computer C110 is preferably part of a computer system C100 that may include conventional components such as display C150 (e.g. cathode ray tube, flat panel display), printer C160, keyboard/control panel C130, mouse C135, input device C140, output device C170, scanner C190, and network connection C195.

A mass storage device C120 such as a magnetic or optical drive C120 may be connected to the computer C110. The mass storage device may be used to store a computer program which performs the invention when loaded into the computer C110. Mass storage device C120 may also store image data before, during and after processing by the invention.

As an alternative, the network connection C195 may provide a connection to an off-line storage device which supplies the computer program to the computer C110.

The computer program embodiment of the invention may be loaded from the mass storage device C120 into the internal memory C115 of the computer C110. The result is that the general purpose computer C110 is transformed into a special purpose machine that implements the invention.

Even more particularly, each step of inventive method transforms at least a portion of the general purpose computer C110 into a special purpose computer module implementing that step. For example, when the first selection step is implemented on the computer C110, the result is a computer implemented apparatus that selects at least two runs from one or more series of runs of one or more images on the basis of pixel position information including values for a column and a row of each image.

Other embodiments of the invention include firmware embodiments and hardware embodiments wherein the inventive method is programmed into firmware (such as an EPROM, PROM or PLA), wholly constructed with hardware components or constructed with various combinations of software, firmware and hardware. Constructing such software, firmware and hardware embodiments of the invention is a routine matter to one of ordinary skill using known techniques.

Article of Manufacture

The invention disclosed herein may also take the form of an article of manufacture. More specifically, the article of manufacture embodiment is a computer-usable medium, including a computer-readable program code embodied therein wherein the computer-readable code causes computer C110 to execute the inventive methods.

A computer diskette such as disc C180 in FIG. 8 is an example of such a computer-usable medium. When the disc C180 is inserted into the mass storage device C180, the computer-readable program code stored therein is transferred into the computer C110. In this way, the computer C110 may be instructed to perform the inventive methods disclosed herein.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of performing an image processing operation on pixels of one or more images divided into pixels, wherein an image is represented by a series of consecutive runs with runlengths and corresponding pixel values wherein a runlength represents the number of consecutive pixels having mutually identical pixel values and the image processing operation is performed successively on groups of consecutive pixels, the method comprising the steps of:

a first selection step for selecting at least two runs from one or more series of runs of one or more images on the basis of pixel position information including values for a column and a row of each image;

a runlength processing operation for processing the runlengths and the pixel values of the runs selected in said first selection step in accordance with the image processing operation in order to obtain a resultant run having a resultant runlength and a resultant pixel value;

a shortening step for shortening at least one of the runlengths of the selected runs by a value derived from the determined resultant runlength;

storing the resultant run in a series of resultant runs;

a step size determining step for determining a step size derived from the resultant runlength;

a second selection step for selecting the one or more shortened runs and/or one or more following runs from the one or more series of runs representing the one or more images on the basis of the step size determined by said step size determining step; and repeatedly performing the above steps until all the runs have been processed;

said first and second selecting steps selecting runs from a first and a second series of runs which represent a first and second image respectively, wherein runs with an identical pixel starting position are selected from both series in each of said first and second selection steps;

said runlength processing operation including the following steps:

comparing the pixel value for a run from the first series with the pixel value of a run from the second series wherein in a first event that the pixel value of the first run has a first value, the pixel value of the run from the second series is selected as the value of a resultant run and wherein in a second event the pixel value of the run from the first series is selected as the resultant pixel value of the resultant run;

the method further comprising:

a smallest runlength selecting step for selecting the smallest runlength of the runs from the first and second series as the resultant runlength of the resultant run;

said shortening step shortening the runlength of the largest selected runlength by the length of the resultant runlength; and said step size determining step takes the resultant runlength as the step size.

2. The method according to claim 1, further comprising a combination step for combining the resultant runs obtained after a runlength processing operation.

3. A method of performing an image processing operation on pixels of one or more images divided into pixels, wherein an image is represented by a series of consecutive runs with runlengths and corresponding pixel values wherein a runlength represents the number of consecutive pixels having mutually identical pixel values and the image processing operation is performed successively on groups of consecutive pixels, the method comprising the steps of:

a first selection step for selecting at least two runs from one or more series of runs of one or more images on the basis of pixel position information including values for a column and a row of each image;

a runlength processing operation for processing the runlengths and the pixel values of the runs selected in said first selection step in accordance with the image processing operation in order to obtain a resultant run having a resultant runlength and a resultant pixel value;

a shortening step for shortening at least one of the runlengths of the selected runs by a value derived from the determined resultant runlength;

storing the resultant run in a series of resultant runs;

a step size determining step for determining a step size derived from the resultant runlength;

a second selection step for selecting the one or more shortened runs and/or one or more following runs from the one or more series of runs representing the one or more images on the basis of the step size determined by said step size determining step; and repeatedly performing the above steps until all the runs have been processed;

said first and second selection steps selecting runs from a first, second and third series of runs which respectively represent a first, second and third image, wherein runs with an identical pixel starting position are selected from the first, second and third series of runs in each of said first and second selection steps;

said runlength processing operation takes as the resultant pixel value of the resultant run the weighted average of the pixel values of the selected runs from the first and second series of runs with the weighting factor being the pixel value of the runs from the third series of runs; and said runlength processing step sets the resultant runlength of the resultant run to the smallest runlength of the selected runs of the first, second and third series of runs, said shortening step shortens the runlength of the largest selected runlength by the length of the resultant runlength; and said step size determining step the resultant runlength as the step size.

4. A method of performing an image processing operation on pixels of one or more images divided into pixels, wherein an image is represented by a series of consecutive runs with runlengths and corresponding pixel values wherein a runlength represents the number of consecutive pixels having mutually identical pixel values and the image processing operation is performed successively on groups of consecutive pixels, the method comprising the steps of:

a first selection step for selecting at least two runs from one or more series of runs of one or more images on the basis of pixel position information including values for a column and a row of each image;

a runlength processing operation for processing the runlengths and the pixel values of the runs selected in said first selection step in accordance with the image processing operation in order to obtain a resultant run having a resultant runlength and a resultant pixel value;

a shortening step for shortening at least one of the runlengths of the selected runs by a value derived from the determined resultant runlength;

storing the resultant run in a series of resultant runs;

a step size determining step for determining a step size derived from the resultant runlength;

a second selection step for selecting the one or more shortened runs and/or one or more following runs from the one or more series of runs representing the one or more images on the basis of the step size determined by said step size determining step; and repeatedly performing the above steps until all the runs have been processed;

said first and second selection steps selecting runs with an identical pixel starting position from a first and a second consecutive image line respectively;

wherein in the event that the runlengths of the selected runs are all larger than one said runlength processing operation averages the pixel value of a run from the first image line with the pixel value of a run from the second image line wherein the average pixel value thus determined is taken as the resultant pixel value of the resultant run and where in addition, half the smallest runlength of the runlengths of the two runs is selected as the resultant runlength of the resultant run, said shortening step shortens the runlength of the largest selected run by twice the length of the resultant runlength and said step size determining step takes as the step size twice the resultant runlength determined in the preceding runlength processing operation.

5. An apparatus for performing an image processing operation on pixels of one or more images divided into pixels, wherein an image is represented by a series of consecutive runs with runlengths and corresponding pixel values wherein a runlength represents the number of consecutive pixels having mutually identical pixel values and the image processing operation is performed successively on groups of consecutive pixels, the apparatus comprising:

a first selector for selecting at least two runs from one or more series of runs of one or more images on the basis of pixel position information including values for a column and a row of each image;

a runlength processor for processing the runlengths and the pixel values of the runs selected by said first selector in accordance with the image processing operation in order to obtain a resultant run having a resultant runlength and a resultant pixel value;

a runlength shortener for shortening at least one of the runlengths of the selected runs by a value derived from the determined resultant runlength;

a memory device for storing the resultant run in a series of resultant runs;

a step size determiner for determining a step size derived from the resultant runlength;

a second selector for selecting the one or more shortened runs and/or one or more following runs from the one or more series of runs representing the one or more images on the basis of the step size determined by said step size determiner; and an iterator for causing said first selector, said runlength processor, said runlength shortener, said memory device, said step size determiner, and said second selector to repeatedly perform their respective operations until all the runs have been processed;

said first and second selectors selecting runs from a first and a second series of runs which represent a first and second image respectively, wherein runs with an identical pixel starting position are selected from both series in each of said first and second selectors;

said runlength processor including:
- a comparator for comparing the pixel value for a run from the first series with the pixel value of a run from the second series
- wherein in a first event that the pixel value of the first run has a first value, the pixel value of the run from the second series is selected as the value of a resultant run and
- wherein in a second event the pixel value of the run from the first series is selected as the resultant pixel value of the resultant run;

the apparatus further comprising:
- a smallest runlength selector for selecting the smallest runlength of the runs from the first and second series as the resultant runlength of the resultant run;
- said runlength shortener shortening the runlength of the largest selected runlength by the length of the resultant runlength; and
- said step size determiner taking the resultant runlength as the step size.

6. The apparatus according to claim 5, further comprising a combiner for combining the resultant runs obtained after said runlength processor performs the runlength processing operation.

7. An apparatus for performing an image processing operation on pixels of one or more images divided into pixels, wherein an image is represented by a series of consecutive runs with runlengths and corresponding pixel values wherein a runlength represents the number of consecutive pixels having mutually identical pixel values and the image processing operation is performed successively on groups of consecutive pixels, the apparatus comprising:

- a first selector for selecting at least two runs from one or more series of runs of one or more images on the basis of pixel position information including values for a column and a row of each image;
- a runlength processor for processing the runlengths and the pixel values of the runs selected by said first selector in accordance with the image processing operation in order to obtain a resultant run having a resultant runlength and a resultant pixel value;
- a runlength shortener for shortening at least one of the runlengths of the selected runs by a value derived from the determined resultant runlength;
- a memory device for storing the resultant run in a series of resultant runs;
- a step size determiner for determining a step size derived from the resultant runlength;
- a second selector for selecting the one or more shortened runs and/or one or more following runs from the one or more series of runs representing the one or more images on the basis of the step size determined by said step size determiner; and
- an iterator for causing said first selector, said runlength processor, said runlength shortener, said memory device, said step size determiner, and said second selector to repeatedly perform their respective operations until all the runs have been processed;

said first and second selectors selecting runs from a first, second and third series of runs which respectively represent a first, second and third image, wherein runs with an identical pixel starting position are selected from the first, second and third series of runs in each of said first and second selectors;

said runlength processor taking as the resultant pixel value of the resultant run the weighted average of the pixel values of the selected runs from the first and second series of runs with the weighting factor being the pixel value of the runs from the third series of runs; and said runlength processor setting the resultant runlength of the resultant run to the smallest runlength of the selected runs of the first, second and third series of runs, said runlength shortener shortening the runlength of the largest selected runlength by the length of the resultant runlength; and said step size determiner determining the resultant runlength as the step size.

8. An apparatus for performing an image processing operation on pixels of one or more images divided into pixels, wherein an image is represented by a series of consecutive runs with runlengths and corresponding pixel values wherein a runlength represents the number of consecutive pixels having mutually identical pixel values and the image processing operation is performed successively on groups of consecutive pixels, the apparatus comprising:

- a first selector for selecting at least two runs from one or more series of runs of one or more images on the basis of pixel position information including values for a column and a row of each image;
- a runlength processor for processing the runlengths and the pixel values of the runs selected by said first selector in accordance with the image processing operation in order to obtain a resultant run having a resultant runlength and a resultant pixel value;
- a runlength shortener for shortening at least one of the runlengths of the selected runs by a value derived from the determined resultant runlength;
- a memory device for storing the resultant run in a series of resultant runs;
- a step size determiner for determining a step size derived from the resultant runlength;
- a second selector for selecting the one or more shortened runs and/or one or more following runs from the one or more series of runs representing the one or more images on the basis of the step size determined by said step size determiner; and
- an iterator for causing said first selector, said runlength processor, said runlength shortener, said memory device, said step size determiner, and said second selector to repeatedly perform their respective operations until all the runs have been processed;

said first and second selectors selecting runs with an identical pixel starting position from a first and a second consecutive image line respectively;

wherein in the event that the runlengths of the selected runs are all larger than one said runlength processor averaging the pixel value of a run from the first image line with the pixel value of a run from the second image line wherein the average pixel value thus determined is taken as the resultant pixel value of the resultant run and where in addition, half the smallest runlength of the runlengths of the two runs is selected as the resultant runlength of the resultant run, said runlength shortener shortening the runlength of the largest selected run by twice the length of the resultant runlength and said step size determiner taking as the step size twice the resultant runlength determined in the preceding runlength processing operation.

9. An article of manufacture, comprising:

a computer-usable medium including computer-readable program code means, embodied therein, for causing a computer to perform an image processing operation on pixels of one or more images divided into pixels, wherein an image is represented by a series of consecutive runs with runlengths and corresponding pixel values wherein a runlength represents the number of consecutive pixels having mutually identical pixel values and the image processing operation is performed successively on groups of consecutive pixels, the computer-readable program code means comprising:

first computer-readable program code means for selecting at least two runs from one or more series of runs of one or more images on the basis of pixel position information including values for a column and a row of each image;

computer-readable program code means for processing the runlengths and the pixel values of the runs selected by said first selector in accordance with the image processing operation in order to obtain a resultant run having a resultant runlength and a resultant pixel value;

computer-readable program code means for shortening at least one of the runlengths of the selected runs by a value derived from the determined resultant runlength;

computer-readable program code means for storing the resultant run in a series of resultant runs;

computer-readable program code means for determining a step size derived from the resultant runlength;

second computer-readable program code means for selecting the one or more shortened runs and/or one or more following runs from the one or more series of runs representing the one or more images on the basis of the step size determined by said computer-readable program code means for determining a step size; and computer-readable program code means for causing said first computer-readable program code means for selecting, said computer-readable program code means for processing, said computer-readable program code means for shortening, said computer-readable program code means for storing, said computer-readable program code means for determining step size, and said second computer-readable program code means for selecting to repeatedly perform their respective operations until all the runs have been processed;

said first and second computer-readable program code selecting means selecting runs from a first and a second series of runs which represent a first and second image respectively, wherein runs with an identical pixel starting position are selected from both series in each of said first and second computer-readable program code selecting means;

said computer-readable program code means for processor further including:

computer-readable program code means for comparing the pixel value for a run from the first series with the pixel value of a run from the second series wherein in a first event that the pixel value of the first run has a first value, the pixel value of the run from the second series is selected as the value of a resultant run and wherein in a second event the pixel value of the run from the first series is selected as the resultant pixel value of the resultant run;

the computer-readable program means further comprising:

computer-readable program code means for selecting the smallest runlength of the runs from the first and second series as the resultant runlength of the resultant run;

computer-readable program code means for shortening the runlength of the largest selected runlength by the length of the resultant runlength; and said computer-readable program code means for determining step size taking the resultant runlength as the step size.

10. The article of manufacture according to claim 9, further comprising computer-readable program code means for combining the resultant runs obtained after said computer-readable program code means for processing performs the runlength processing operation.

11. An article of manufacture, comprising:

a computer-usable medium including computer-readable program code means, embodied therein, for causing a computer to perform an image processing operation on pixels of one or more images divided into pixels, wherein an image is represented by a series of consecutive runs with runlengths and corresponding pixel values wherein a runlength represents the number of consecutive pixels having mutually identical pixel values and the image processing operation is performed successively on groups of consecutive pixels, the computer-readable program code means comprising:

first computer-readable program code means for selecting at least two runs from one or more series of runs of one or more images on the basis of pixel position information including values for a column and a row of each image;

computer-readable program code means for processing the runlengths and the pixel values of the runs selected by said first selector in accordance with the image processing operation in order to obtain a resultant run having a resultant runlength and a resultant pixel value;

computer-readable program code means for shortening at least one of the runlengths of the selected runs by a value derived from the determined resultant runlength;

computer-readable program code means for storing the resultant run in a series of resultant runs;

computer-readable program code means for determining a step size derived from the resultant runlength;

second computer-readable program code means for selecting the one or more shortened runs and/or one or more following runs from the one or more series of runs representing the one or more images on the basis of the step size determined by said computer-readable program code means for determining a step size; and computer-readable program code means for causing said first computer-readable program code means for selecting, said computer-readable program code means for processing, said computer-readable program code means for shortening, said computer-readable program code means for storing, said computer-readable program code means for determining step size, and said second computer-readable program code means for selecting to repeatedly perform their respective operations until all the runs have been processed;

said first and second computer-readable program code selecting means selecting runs from a first, second and third series of runs which respectively represent a first, second and third image, wherein runs with an identical pixel starting position are selected from the first, second and third series of runs in each of said first and second computer-readable program code means for selecting;

said computer-readable program code means for processing taking as the resultant pixel value of the resultant run the weighted average of the pixel values of the selected runs from the first and second series of runs with the weighting factor being the pixel value of the runs from the third series of runs; and said computer-readable program code means for processing setting the resultant runlength of the resultant run to the smallest runlength of the selected runs of the first, second and third series of runs, said computer-readable program code shortening means shortening the runlength of the largest selected runlength by the length of the resultant runlength; and said computer-readable program code means for determining step size determining the resultant runlength as the step size.

12. An article of manufacture, comprising:

a computer-usable medium including computer-readable program code means, embodied therein, for causing a computer to perform an image processing operation on pixels of one or more images divided into pixels, wherein an image is represented by a series of consecutive runs with runlengths and corresponding pixel values wherein a runlength represents the number of consecutive pixels having mutually identical pixel values and the image processing operation is performed successively on groups of consecutive pixels, the computer-readable program code means comprising:

first computer-readable program code means for selecting at least two runs from one or more series of runs of one or more images on the basis of pixel position information including values for a column and a row of each image;

computer-readable program code means for processing the runlengths and the pixel values of the runs selected by said first selector in accordance with the image processing operation in order to obtain a resultant run having a resultant runlength and a resultant pixel value;

computer-readable program code means for shortening at least one of the runlengths of the selected runs by a value derived from the determined resultant runlength;

computer-readable program code means for storing the resultant run in a series of resultant runs;

computer-readable program code means for determining a step size derived from the resultant runlength;

second computer-readable program code means for selecting the one or more shortened runs and/or one or more following runs from the one or more series of runs representing the one or more images on the basis of the step size determined by said computer-readable program code means for determining a step size; and computer-readable program code means for causing said first computer-readable program code means for selecting, said computer-readable program code means for processing, said computer-readable program code means for shortening, said computer-readable program code means for storing, said computer-readable program code means for determining step size, and said second computer-readable program code means for selecting to repeatedly perform their respective operations until all the runs have been processed;

said first and second computer-readable program code selecting means selecting runs with an identical pixel starting position from a first and a second consecutive image line respectively;

wherein in the event that the runlengths of the selected runs are all larger than one said computer-readable program code means for processor averaging the pixel value of a run from the first image line with the pixel value of a run from the second image line wherein the average pixel value thus determined is taken as the resultant pixel value of the resultant run and where in addition, half the smallest runlength of the runlengths of the two runs is selected as the resultant runlength of the resultant run, said computer-readable program code shortening means shortening the runlength of the largest selected run by twice the length of the resultant runlength and said computer-readable program code means for determining step size taking as the step size twice the resultant runlength determined in the preceding runlength processing operation.

13. The method according to claim 3, further comprising a combination step for combining the resultant runs obtained after a runlength processing operation.

14. The method according to claim 4, further comprising a combination step for combining the resultant runs obtained after a runlength processing operation.

15. The apparatus according to claim 7, further comprising a combiner for combining the resultant runs obtained after said runlength processor performs the runlength processing operation.

16. The apparatus according to claim 8, further comprising a combiner for combining the resultant runs obtained after said runlength processor performs the runlength processing operation.

17. The article of manufacturing according to claim 11, further comprising computer-readable program code means for combining the resultant runs obtained after said computer-readable program code means for processing performs the runlength processing operation.

18. The article of manufacturing according to claim 12, further comprising computer-readable program code means for combining the resultant runs obtained after said computer-readable program code means for processing performs the runlength processing operation.

* * * * *